United States Patent [19]
Witt

[11] Patent Number: 5,291,070
[45] Date of Patent: Mar. 1, 1994

[54] MICROPROCESSOR SYNCHRONOUS TIMING SYSTEM

[75] Inventor: David B. Witt, Austin, Tex.

[73] Assignee: Advanced Micro Devices, Inc., Sunnyvale, Calif.

[21] Appl. No.: 647,491

[22] Filed: Jan. 28, 1991

[51] Int. Cl.[5] .............................................. H03K 5/13
[52] U.S. Cl. .................................. 307/269; 307/262; 328/55; 328/63; 328/72; 328/155
[58] Field of Search ............... 307/269, 262, 601, 603, 307/597; 328/55, 63, 72, 155

[56] References Cited

U.S. PATENT DOCUMENTS

| | | | |
|---|---|---|---|
| 4,596,937 | 6/1986 | Johnson | 307/269 |
| 4,675,612 | 6/1987 | Adams et al. | 328/63 |
| 4,691,122 | 9/1987 | Schnizlein et al. | 307/269 |
| 4,700,084 | 10/1987 | Honaker, Jr. | 307/269 |
| 4,713,621 | 12/1987 | Nakamura et al. | 328/55 |
| 4,754,164 | 6/1988 | Flora et al. | 307/269 |
| 4,914,325 | 4/1990 | Yamada | 307/592 |
| 4,929,850 | 5/1990 | Breuninger | 307/272.2 |
| 5,059,818 | 10/1991 | Witt et al. | 307/269 |
| 5,093,581 | 3/1992 | Briggs et al. | 307/265 |

Primary Examiner—William L. Sikes
Assistant Examiner—Terry D. Cunningham
Attorney, Agent, or Firm—Foley & Lardner

[57] ABSTRACT

There is disclosed a timing system for use in a microprocessor for initiating microprocessor outputs onto an input sampling from an external bus in synchronism with a bus timing clock. The timing system is operative in a first mode for internally generating the bus timing clock and in a second mode for being driven from an externally generated bus timing clock. In the first mode, the timing system generates first and second inverse phase timing clocks responsive to an external clock source and independently generates the internally generated bus timing clock with the rising edges of the bus timing clock coinciding with the rising edges of the first microprocessor timing clock and the falling edges of the second microprocessor timing clock. In the second mode, the timing system generates the first and second microprocessor timing clocks in response to the externally generated bus timing clock. In both modes, the timing system initiates an output onto the bus upon the common assertion of the first microprocessor timing clock and the bus timing clock and initiates sampling of an input from the external bus upon the inverse assertion of the second microprocessor timing clock and the bus timing clock.

42 Claims, 4 Drawing Sheets

MICROPROCESSOR SYNCHRONOUS TIMING SYSTEM

BACKGROUND OF THE INVENTION

The present invention generally relates to a timing system for use in a microprocessor for initiating microprocessor outputs onto and input sampling from an external bus in synchronism with a bus timing clock on the bus. The present invention more particularly relates to such a timing system which is configurable for providing the external bus with the bus timing clock or being driven by an externally generated bus timing clock. The timing system of the present invention is configured to provide the bus with the bus timing clock and when so configured, is also arranged to minimize the time required to provide an output onto the bus (clock to output time). The timing system is also configured to be readily driven by an externally generated bus timing clock.

Processing systems which incorporate at least one processor and at least one device, such as a memory, external to the microprocessor generally include an external bus to permit the microprocessor to perform external accesses. When such external accesses are required, such as when the microprocessor provides an output onto the external bus or samples an input from the external bus, the external accesses must be performed by the microprocessor in synchronism with the bus timing clock which controls the timing of the external bus. Such synchronization is required because the bus timing clock may or may not be at the same frequency as the microprocessor timing clocks and, in either case, is generally not in phase with the microprocessor timing clocks. In addition, such synchronization is further required because the external bus timing generally only permits microprocessor outputs onto the external bus when the bus clock is in a predetermined portion of its cycle, such as when the bus clock is at a high level, and only permits input sampling from the external bus when the external bus timing clock is in another predetermined portion of its clock cycle, such as when the bus timing clock is at a low level. Hence, microprocessors generally require a timing system for synchronizing external bus accesses with the bus timing clock which controls the timing of the external bus.

In one microprocessing system, the synchronizing timing depends on the occurrence of the rising edges of the bus timing clock. Upon a rising edge of the bus timing clock, the external bus is ready to receive outputs, such as data, from the microprocessor. The time required for the microprocessor to provide an output from the rising edge of the bus timing clock is referred to as the clock to output time and is an important parameter since, as the clock to output time is shortened, the time that the external system has for sampling the microprocessor outputs is lengthened. Also of importance is the set-up time which is the time from when an input to be sampled by the microprocessor is provided by the external bus to the next rising edge of the bus timing clock. As the set-up time is shortened, the time in which the external bus must hold the input data valid is decreased. Also, a shortened set-up time gives the external system more time to sample a responsive output from the microprocessor, such as when the microprocessor must change the state of the bus during the next bus timing clock cycle.

Microprocessors are also often required to generate the bus timing clock for the external bus and the external system in addition to generating its own internal timing clocks. The timing system of one known microprocessor is adapted to be coupled to an external clock source having a frequency twice that of the bus timing clock and the microprocessor internal timing clocks. In this microprocessor, the timing system uses the external clock to derive an intermediate clock from which it generates the bus timing clock. The bus timing clock is then used to generate the internal microprocessor timing clocks. While this configuration is satisfactory, the clock to output time is lengthened since the rising edges of the internal microprocessor clock controlling outputs is necessarily delayed with respect to the rising edges of the bus timing clock.

The timing systems of microprocessors are also called upon to be driven by an externally generated bus timing clock, as for example in multiprocessor systems. The aforementioned prior art processor still generates its own internal timing clocks in response to the externally generated bus timing clock. Unfortunately, the implementation of this system leaves much to be desired. For example, required internal duty cycles, to satisfy microprocessor speed path requirements, must be met. This problem is aggravated by the requirement that the externally generated bus timing clock be a CMOS input requiring TTL (transistor-transistor logic) level translation which skews the duty cycles from which the microprocessor internal timing clocks are derived. This makes it difficult for duty cycle requirements of the internal microprocessor timing clocks to be met for high frequency microprocessor operation.

There is therefore a need in the art for a new and improved timing system for use in a microprocessor for synchronizing microprocessor external accesses to the bus timing clock of an external bus. Such a timing system should be configured to be readily implemented to be driven by an externally generated bus timing clock. Such a timing system should be further configured for providing the external bus with the bus timing clock and, when so configured, should additionally be capable of reducing the clock to output times.

SUMMARY OF THE INVENTION

The present invention therefore provides a timing system for use in a microprocessor for synchronizing microprocessor outputs onto an external bus with the bus timing clock on the external bus. The timing system is adapted to be coupled to an external clock source and includes buffer means including an input adapted to be coupled to the external clock source for generating an intermediate clock in response to the external clock source, first generating means coupled to the buffer means for generating first and second microprocessor timing clocks responsive to the intermediate clock with the first and second timing clock being of inverse phase relation and second generating means coupled to the buffer means and adapted to be coupled to the external bus for providing the external bus with the bus timing clock responsive to the intermediate clock. The second and first generating means are arranged such that the rising edges of the bus timing clock substantially coincide with the rising edges of the first timing clock and the falling edges of the second timing clock. The timing system further includes output means coupled to the first and second generating means and adapted to be coupled to the external bus for initiating a microprocessor output onto the external bus upon the common assertion of the bus timing clock and the first timing clock.

The timing system may also include input means adapted to be coupled to the external bus and coupled to the first and second generating means for initiating the reception of an input from the external bus upon inverse assertion of the bus timing clock and the second timing clock.

The present invention further provides a timing system for use in a microprocessor for synchronizing microprocessor external bus outputs with a bus timing clock. The timing system provides improved flexibility by being configured for either generating the bus timing clock when in a first mode of operation or being driven by an externally generated bus timing clock when in a second mode of operation. The timing system includes buffer means having an input adapted to be coupled to an external clock source for generating a first intermediate clock when said timing system is operable in said first mode or coupled to an externally generated bus timing clock for generating a second intermediate clock when the timing system is operable in the second mode and first generating means coupled to the buffer means for generating first and second microprocessor timing clocks in response to the first intermediate clock when the timing system is in the first mode and in response to the second intermediate clock when the timing system is in the second mode. The first and second timing clocks are opposite in phase relation. The timing system further includes second generating means coupled to the buffer means when said timing system is in the first mode for internally generating the bus timing clock in response to the first intermediate clock. The second generating means also includes an output adapted to be coupled to the bus for providing the bus with the internally generated bus timing clock when the timing system is in the first mode and also being adapted to be coupled to the bus when the timing system is in the second mode for receiving the externally generated bus timing clock. The timing system further includes enable means responsive to a select signal for coupling the second generating means to the buffer means when the timing system is in the first mode and decoupling the second generating from the buffer means when the timing system is in the second mode and output means coupled to the first generating means for receiving the first timing clock and coupled to the second generating means output for receiving the internally generated bus timing clock when the timing system is in the first mode or the externally generated bus timing clock when the timing system is in the second mode. The output means is also coupled to the bus and is arranged to initiate an output onto the bus upon the common assertion of the first timing clock and the internally generated bus timing clock when the timing system is in the first mode or upon the common assertion of the first timing clock and the externally generated bus timing clock when the timing system is in the second mode.

BRIEF DESCRIPTION OF THE DRAWINGS

The features of the present invention which are believed to be novel are set forth with particularity in the appended claims. The invention, together with further objects and advantages thereof, may best be understood by making reference to the following description, taken in conjunction with the accompanying drawings, in the several figures of which like reference characters identify identical elements, and wherein:

DETAILED DESCRIPTION OF THE PREFERRED EMBODIMENT

Figure 1A:
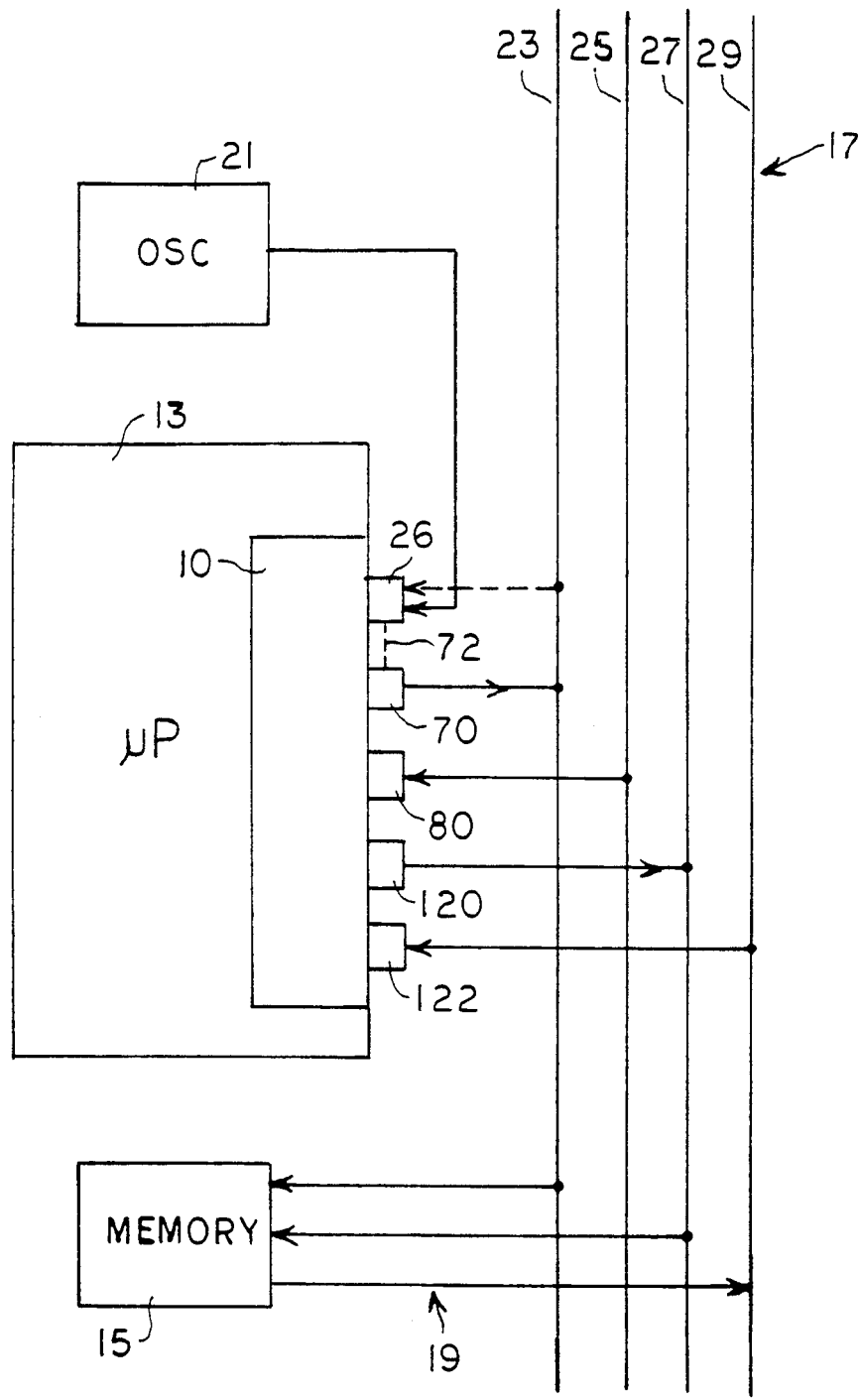
FIG. 1A is a schematic circuit diagram of a processing system in which the present invention may be used.

Referring now to FIG. 1A, it illustrates a processing system 11 in which the present invention may be used. The processing system 11 generally includes a microprocessor 13, a memory 15, an external bus 17, and an external clock source 21. The external bus 17 couples electrical signals, including a bus timing clock signal, between the components of the processing system 11. The external bus 17 preferably includes at least a first conductor 23 for conveying the bus timing clock signal, a second conductor 25 for conveying a select signal, a third conductor 27 for conveying data from the microprocessor 13 to the memory 15, and a fourth conductor 29 for conveying data from the memory 15 to the microprocessor 13. The memory 15 is coupled to the external bus 17 by memory bus 19. Similarly, the microprocessor 13 is coupled to the external bus 17 by a plurality of external pins such as external input pin 26, external pin 70, external pin 80, output pin 120 and input pin 122. The microprocessor 13 also preferably includes a timing system 10.

Figure 1B:
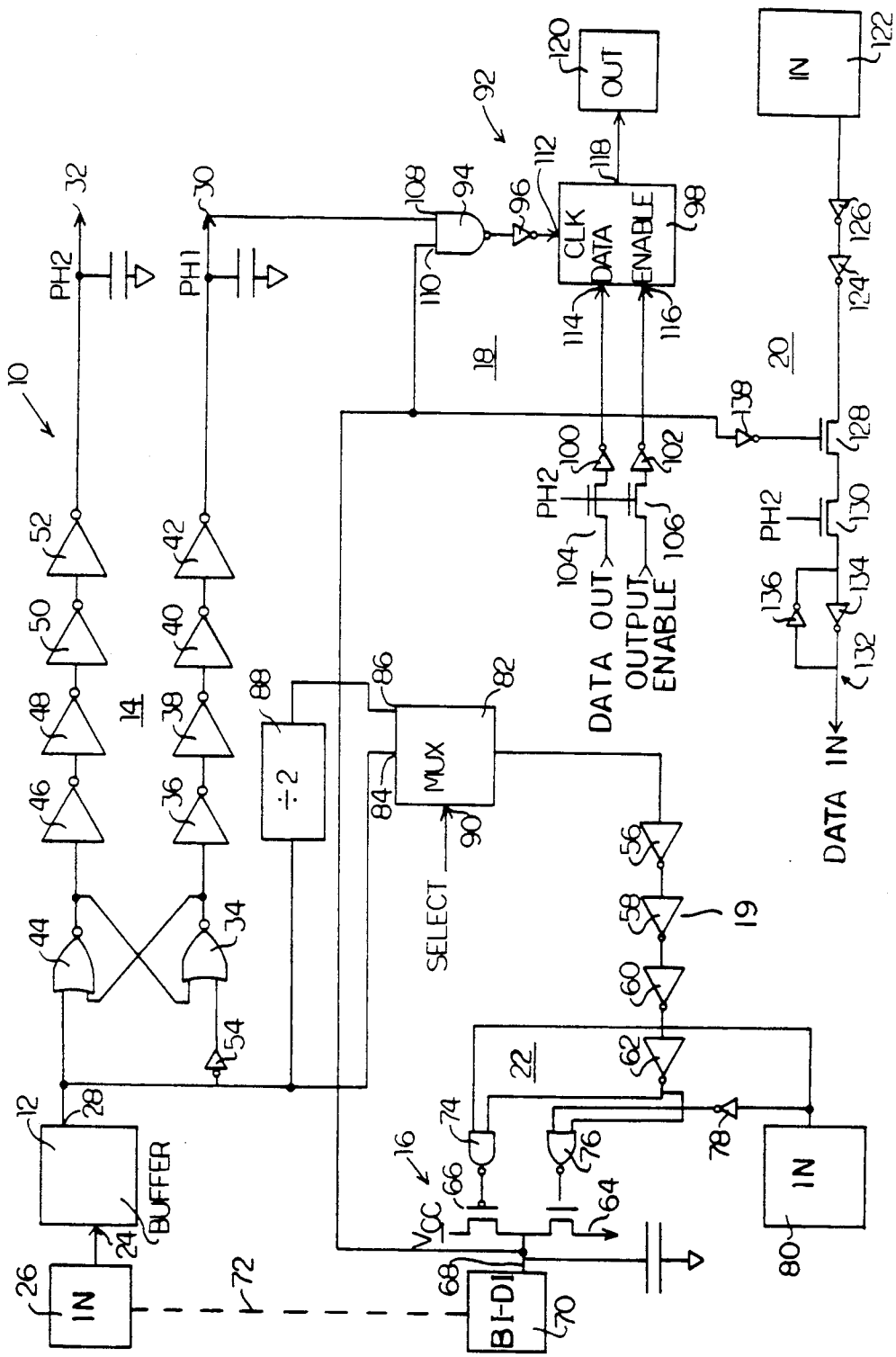
FIG. 1B is a schematic circuit diagram of a timing system embodying the present invention.

Referring now to FIG. 1B, it illustrates a timing system 10 embodying the present invention. The timing system 10 generally includes a buffer 12, delay means 19, first generating means 14, second generating means 16, output means 18, input means 20, and enable means 22. The timing system 10 is preferably implemented within the integrated circuit of the microprocessor and is thus preferably implemented using CMOS technology.

The buffer 12 includes an input 24 which is coupled to an external input pin 26 of the integrated circuit. As will be described more fully hereinafter, the timing system 10 is configured for operation in a first mode wherein the timing system provides an external bus 17 with its bus timing clock in response to an external clock source 21 being coupled to the input pin 26 and operative in a second mode of operation wherein the timing system 10 is driven by an externally generated bus timing clock which is coupled to the input pin 26.

The buffer 12 has an output 28 which is coupled to the first generating means 14. When the timing system is in the first mode of operation, the buffer 12 provides at its output 28, a first intermediate clock, in response to the external clock source coupled to input pin 26 and when the timing system is operative in the second mode of operation, the buffer 12 provides at its output 28 a second intermediate clock in response to the externally generated bus timing clock coupled to input pin 26. The intermediate clocks are utilized by the first generating means 14 for providing at outputs 30 and 32 first and second microprocessor timing clocks PH1 and PH2 respectively.

The buffer 12 buffers the input clocks that it receives and provides TTL translation when the input clock to buffer 12 is an externally generated bus timing clock. In addition, the buffer 12 provides duty cycle adjustments to accommodate speed paths within the microprocessor. Preferably, the buffer 12, in practicing the present invention, is a self-regulating clock generator of the type fully described in co-pending U.S. patent application Ser. No. 07/532,311, filed Jun. 1, 1990, now U.S. Pat. No. 5,059,818 in the names of David B. Witt and Brian D. McMinn entitled SELF-REGULATING CLOCK GENERATOR, which application is assigned to the assignee of the present invention and which is incorporated herein by reference.

The first generating means 14, responsive to the intermediate clocks provided by the buffer 12 at output 28, generates at outputs 30 and 32 first and second microprocessor timing clocks PH1 and PH2 respectively which are of inverse phase relation. The first generating means includes a first NOR gate 34, a first plurality of buffering inverters 36, 38, 40 and 42, a second NOR gate 44, a second plurality of buffering inverters 46, 48, 50 and 52, and another inverter 54. The first plurality of inverters, 36, 38, 40 and 42, are coupled between the output of NOR gate 34 and the output 30 of the first generating means. The second plurality of buffering inverters, 46, 48 50 and 52 are similarly coupled between the output of NOR gate 44 and the output 32 of the first generating means 14. NOR gate 44 has an input coupled directly to the output 28 of buffer 12 and NOR gate 34 has an input which is coupled to the output 28 of buffer 12 through the inverter 54. The NOR gates 34 and 44 each have their outputs and one input cross-coupled. By virtue of this circuit configuration, the first generating means 14 provides the first and second microprocessor timing clocks at outputs 30 and 32 respectively which are in inverse phase relation in response to the intermediate clocks received from the output 28 of the buffer 12.

The delay means 19 includes a plurality of serially coupled inverters 56, 58, 60 and 62. The second generating means 16 is coupled to the buffer means 12 by the delay means 19.

The second generating means 16 includes an N-Channel field-effect transistor 64 and a P-Channel field-effect transistor 66. The second generating means further includes an output 68 which is coupled to an external pin 70. As will be described hereinafter, when the timing system 10 is in the first mode of operation, the second generating means 16 generates the bus timing clock for the external bus 17. For that purpose, the pin 70 is coupled to the external bus for providing the external bus 17 with the bus timing clock generated by the timing system 10 when the timing system 10 is in the first mode of operation.

When the timing system is in the second mode of operation, the external pin 70 is coupled to the external bus 17 as an input for receiving an externally generated bus timing clock. When the timing system in the second mode of operation, the enable means 22 operates to decouple the second generating means 16 from the buffer 12 in a manner to be described hereinafter and the external pin 70 is coupled to the external pin 26 as indicated by the dashed line 72.

The enable means 22 includes a NAND gate 74, a gate 74 have inputs coupled to an external select pin 80 for receiving an externally generated mode select signal. The external select pin 80 is coupled to the external bus 17. When the select signal applied to external pin 80 is a high logic level the NAND gate 74 and NOR gate 76 couple the output of inverter 62 to the gates of the field-effect transistors 66 and 64 to permit the second generating means 16 to generate the bus timing clock at output 68 which is applied to the external pin 70. Hence, when the timing system is in the first mode of operation, the external pin 70 serves as an output pin to provide the external bus 17 with the bus timing clock.

When the select signal applied to external pin 80 is a low logic level, corresponding to the second mode of operation, the NAND gate 74 and NOR gate 76 decouple the output of inverter 62 from the second generating means 16 by turning off field-effect transistors 64 and 66. As a result, in the second mode of operation, the external pin 70 is utilized as an input pin for providing an externally generated bus clock to the output 68 of the second generating means.

The input of inverter 56 is coupled to the output 28 of buffer 12 by a multiplexer 82. The multiplexer 82 has a first input 84 which is coupled directly to the output 28 of buffer 12. A frequency divider 88 couples the other input 86 of multiplexer 82 to the output 28 of buffer 12. The multiplexer further includes a select input 90 for coupling either input 84 to the input of inverter 56 or the input 86 to the input of inverter 56 responsive to a select signal applied at the select input 90. The frequency divider 88 is preferably a divide-by-two frequency divider. This arrangement permits the second generating means 16, when the timing system 10 is in the first mode of operation, to generate a bus timing clock which is either at a frequency equal to the first and second microprocessor timing clocks or at a frequency which is a fraction (one-half) of the first and second microprocessor timing clocks.

As can thus be seen from the foregoing, when the select signal at external pin 80 is at a high logic level, the timing system 10 is configured for operating in the first mode of operation wherein the second generating means 16 provides the external bus with the bus timing clock at external pin 70 in response to the first intermediate clock. The field-effect transistors 64 and 68 by being coupled to the output of inverter 62 when the timing system is in the first mode of operation will provide an internally generated bus timing clock in response to the first intermediate clock provided at output 28 of buffer 12.

When the mode select signal at external pin 80 is at a low logic level, the field-effect transistors 66 and 64 are turned off and thus decoupled from the output of inverter 62 for disabling the second generating means 16. In this mode of operation the external pin 70 is coupled to the external bus 17 for receiving an externally generated bus timing clock which is provided at the output 68 of the second generating means 16.

The plurality of inverters, 56, 58, 60 and 62, are provided to impose an analog delay together with the analog delays imposed by NAND gate 74 and NOR gate 76 so that the rising edges of the internally generated bus timing clock provided by the second generating means 16 when the timing system 10 is in the first mode of operation substantially coincide with the rising edges of the first microprocessor timing clock (PH1) at output 30 and also substantially coincide with the falling edges of the second microprocessor timing clock (PH2) at output 32. As will be appreciated by those skilled in the art, the number of serially coupled inverters may be increased or decreased depending upon the amount of analog delay necessary to substantially coincide the rising edges of the internally generated bus timing clock with the rising edges of the first microprocessor timing clock and the falling edges of the second microprocessor timing clock.

In accordance with this preferred embodiment, the microprocessor, for which the timing system 10 provides timing control, is arranged to provide outputs onto the external bus 17 when the bus timing clock is at a high logic level and to sample inputs from the external bus when the bus timing clock is at a low logic level. To synchronize outputs onto the external bus 17, the output means 18 includes gate means 92 including NAND gate 94 and inverter 96, an output buffer 98, inverters 100 and 102, and N-Channel field-effect transistors 104 and 106.

NAND gate 94 includes a first input 108 coupled to the output 30 of the first generating means 14 for receiving the first microprocessor timing clock and a second input 110 which is coupled to the output 68 of the second generating means 16 for receiving the internally generated bus timing clock when the timing system 10 is operative in the first mode and the externally generated bus timing clock when the timing system is operative in the second mode. The output of NAND gate 94 is coupled to the input of inverter 96 which has its output coupled to the clock input 112 of the output buffer 98. The output buffer 98 includes a data input 114 which is coupled to the output of inverter 100. Inverter 100 has an input which is coupled to the source of field-effect transistor 104. The drain of field-effect transistor 104 is coupled to the source of data within the microprocessor which provides the data to be outputted onto the external bus 17. Thus, transistor 104 receives from the microprocessor the output data to be synchronized with the external bus timing clock. The output buffer 98 also includes an enable input 116 which is coupled to a data enable through inverter 102 and field-effect transistor 106. Thus, transistor 106 receives from the microprocessor the output enable signal which enables the output buffer 98 to update data to be outputted. The gates of the field-effect transistors 104 and 106 are coupled to the output 32 of the first generating means 14 for receiving the second microprocessor timing clock. By virtue of this arrangement, data to be outputted is updated by transistors 104 and 106 during a high phase of PH2 and then outputted under the control of NAND gate 94 as described hereinafter.

The output buffer also includes an output 118 which is coupled to an output pin 120 of the integrated circuit. Output pin 120 is preferably coupled to the external bus 17. Hence, the output buffer 98 is arranged to receive and hold data transferred to it during the high phase of PH2 and to output data onto the external bus 17 during the high phase of PHI after the falling edge of PH2. A tristatable I/O could also be employed by linking output pin 120 with input pin 122.

When the timing system 10 is in the first mode of operation and data is to be outputted onto the external bus, the output means 18 initiates the microprocessor output onto the external bus 17 upon the common assertion of the internally generated bus timing clock and the first microprocessor timing clock. When in the second mode of operation, the output means initiates the microprocessor output onto the external bus upon the common assertion of the externally generated bus timing clock and the first microprocessor timing clock. The common assertion corresponds to the bus timing clocks and the first microprocessor timing clock being at a high logic level. The reason that the assertion is delayed on both of these edges is to insure positive clock to output time and zero hold time on the previous state (for input 110) and to insure no internal speed path from late signals into the output buffer (for input 108).

Upon such common assertion, the output buffer is clocked at its clock input 112 to shift the data being held therein to the output 118 and to the output pin 120 for placement onto the external bus 17. The output onto the external bus 17 will occur after an output delay represented by the delays imposed by the NAND gate 94, the inverter 96 and the output buffer 98. However, when in the first mode of operation, because the rising edges of the internally generated bus timing clock and the rising edges of the first microprocessor timing clock substantially coincide, the clock to output delay will only be the aforementioned output delay plus the slight offset between the rising edges of the internally generated bus timing clock and the first microprocessor timing clock. Thus, the clock to output time is minimized in this system over the aforementioned prior art without inducing any on chip speed paths for signals setting up to the clock late.

The data to be outputted is transferred to and held by the output buffer upon the immediately preceding rising edge of the second microprocessor timing clock combined with an enable data signal applied to the field-effect transistor 106. Since the gates of field-effect transistors 104 and 106 are coupled together, the data to be outputted is latched to the data input 114 of output buffer 98 upon the falling edge of the second microprocessor timing clock which immediately proceeds the common assertion of the first microprocessor timing clock and the bus timing clock.

For sampling inputs from the external bus 17, the input means 20 of the timing system 10 is coupled to an external input pin 122 coupled to the external bus. The input means 20 includes a pair of buffering inverters 124 and 126, first and second N-Channel field-effect transistors 128 and 130 respectively, and a latch 132 comprising reversed coupled inverters 134 and 136. First and second N-channel field-effect transistors 128 and 130 form a gate means. The gate of the first field-effect transistor 128 is coupled to the output 68 of the second generating means 16 through an inverter 138. The gate of field-effect transistor 130 is coupled to the output 32 of the first generating means 14 for receiving the second microprocessor timing clock (PH2). This then allows sampling of the microprocessor input signal received at input pin 122 from the external bus 17 using only the combined signals of PH2 and the bus timing clock. This synchronizes receipt of data from external bus 17 to the internal clocks PH1 and PH2 as well as meeting the setup and hold time requirements of the external system using the bus timing clock.

By virtue of inverter 138, the input means 20 is arranged for initiating the reception of an input from the external bus 17 upon the inverse assertion of the second microprocessor timing clock and the internally generated bus timing clock when the timing system 10 is operative in the first mode or the externally generated bus timing clock when the timing system 10 is operative in the second mode. Such inverse assertion corresponds to the second microprocessor timing clock being at a high logic level and the bus timing clock being at a low logic level. The low logic level of the bus timing clock is inverted by inverter 138 such that upon such inverse assertion, both field-effect transistors 128 and 130 will be turned on to transfer input data from the external bus into the latch 132. The latch 132 is provided to stabilize the sampled data before the sampled data is acted upon by the microprocessor at the beginning of the next clock period of the first microprocessor timing clock (PH1).

Figure 2:
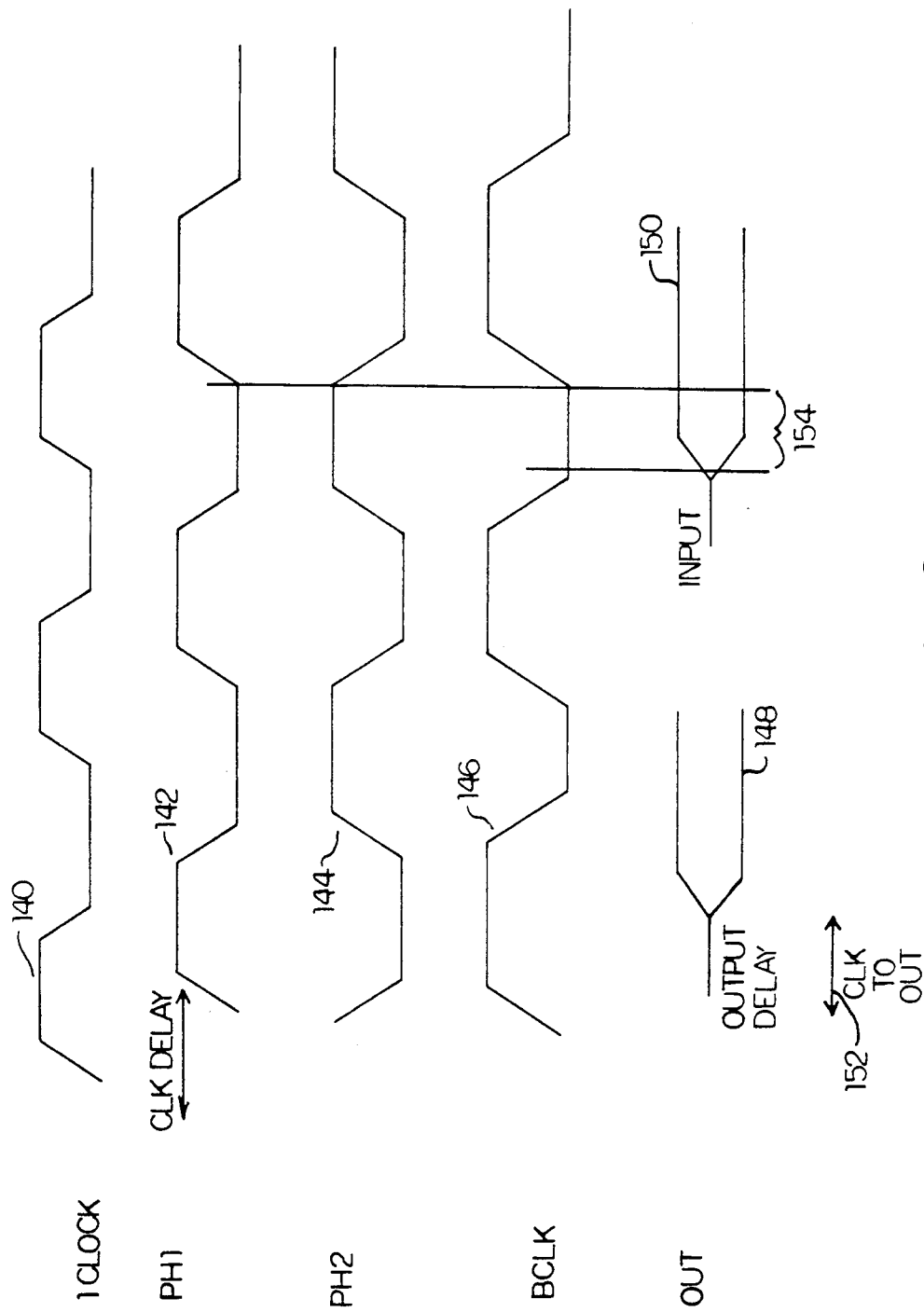
FIG. 2 is a plurality of wave forms illustrating the operation of the timing system of FIG. 1 when operative in a first mode of operation.

Referring now to FIG. 2, the waveforms there depicted illustrate the manner in which the timing system 10 is operative in the first operating mode for initiating outputs onto the external bus 17 and for initiating the sampling of inputs from the external bus 17. More specifically, FIG. 2 illustrates the first intermediate clock 140, the first microprocessor timing clock (PH1) 142, the second microprocessor timing clock (PH2) 144, the internally generated bus timing clock 146, a microprocessor output 148, and an external bus input 150.

As will be noted, the rising edges of the bus timing clock substantially coincide with the rising edges of the first microprocessor timing clock and the falling edges of the second microprocessor timing clock. The clock to output time 152 is represented by the aforementioned output delay and the slight difference between the phase relationship of the bus timing clock and the first microprocessor timing clock which substantially coincide. As a result, the clock to output delay is substantially only the output delay of the microprocessor.

For external bus inputs, it will be noted that the external bus 17 input occurs when the bus timing clock is at a low logic level and the second microprocessor timing clock is at a high logic level. The set-up time therefore is indicated at 154 and is the time between the time at which the input occurs on the external bus and the next rising edge of the bus timing clock.

Figure 3:
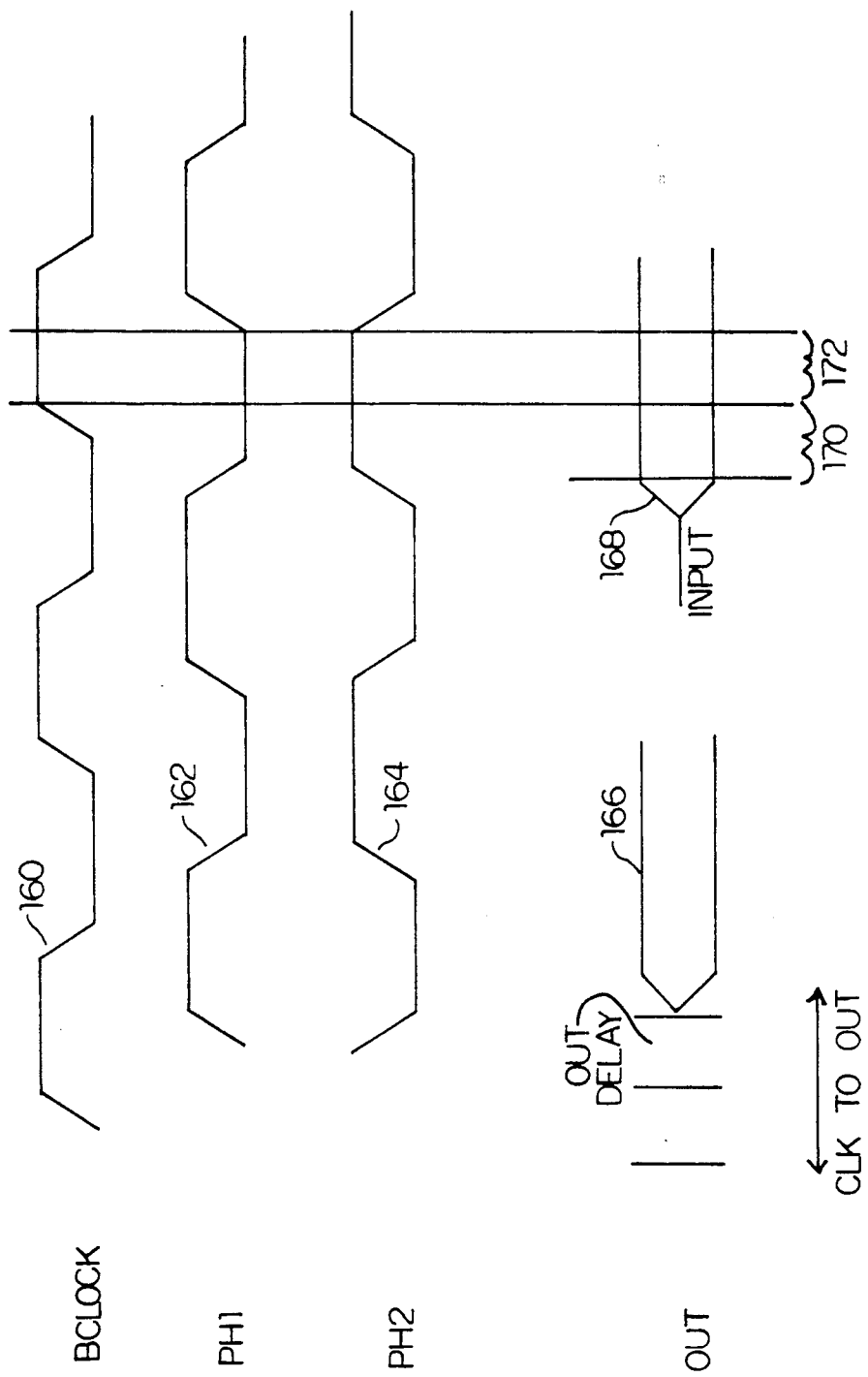
FIG. 3 is a plurality of wave forms illustrating the operation of the timing system of FIG. 1 when operative in a second mode of operation.

Referring now to FIG. 3, it illustrates waveforms which depict the operation of the timing system 10 when operative in the second mode wherein the bus timing clock is provided from an external source and the first generating means 14 generates the first and second microprocessor timing clocks in response to the second intermediate clock which is in turn derived by the buffer 12 from the externally generated bus timing clock. Illustrated in FIG. 3 is the second intermediate timing clock 160, the first microprocessor timing clock (PH1) 162, the second microprocessor timing clock (PH2) 164, a microprocessor output 166 and an external bus input 168. For purposes of this discussion, it is assumed that the delay imposed upon the externally generated bus timing clock by the buffer 12 is negligible and therefore the second intermediate clock 160 substantially corresponds to or, in other words, is in phase with the externally generated bus timing clock.

With respect to the microprocessor output 166, it will be noted that the output occurs after the aforementioned output delay which begins upon the common assertion of the first microprocessor timing clock 162 and the second intermediate clock 160. The total clock to output time is equal to the clock delay imposed by the first generating means 14 in generating the first microprocessor timing clock in response to the second intermediate clock plus the microprocessor output delay.

With respect to the input 68 on the external bus to be sampled by the microprocessor, the set-up time is illustrated at 170 and is the time from the occurrence of the input on the external bus 17 to the next rising edge of the second intermediate clock. This is the set-up time seen by the external system. The real set-up time also includes an additional time period running from the rising edge of the second intermediate clock signal to the next rising edge of the first microprocessor timing clock and is represented at 172. This additional time period represents the time in which the microprocessor will next be able to initiate an output onto the external bus 17 as, for example, when the microprocessor must change the condition of the external bus 17 in response to the input 168.

All of the clock to output and set-up times depicted in FIGS. 2 and 3 are well within acceptable limits for high-speed microprocessor operation, such as, at a frequency of 25 Megahertz. While the clock to output illustrated in FIG. 3 is substantially equal to the clock to output times of prior art timing systems, the present invention exhibits a distinct advantage over prior timing systems in that the first and second microprocessor timing clocks are only loosely coupled to the externally generated bus timing clock and the timing system of the present invention may be more readily implemented for being driven by an externally generated bus timing clock. This is due to the fact that the externally generated bus timing clock need no longer be specified as a CMOS input and the output and input means 18 and 20 respectively are configured for accommodating required duty cycles to accommodate microprocessor speed paths. Also, this system allows a processor to be configured to be optimized for minimizing either clock to output times or set-up times.

While a particular embodiment of the present invention has been shown and described, modifications may be made, and it is therefore intended to cover in the appended claims all such changes and modifications which fall within the true spirit and scope of the invention.

What is claimed is:

1. A timing system for use in a microprocessor for synchronizing the supply of output data from said microprocessor to an external bus with a bus timing clock on said external bus, said timing system comprising:

buffer means including an input for generating an intermediate clock in response to an external clock source;

first generating means coupled to said buffer means for generating first and second internal microprocessor timing clocks responsive to said intermediate clock, said first and second timing clocks being of inverse phase relation;

second generating means coupled to said buffer means for providing said external bus with said bus timing clock responsive to said intermediate clock, said second and first generating means being arranged such that the rising edges of said bus timing clock substantially coincide with the rising edges of said first timing clock and the falling edges of said second timing clock; and output means coupled to said first and second generating means for initiating said supply of output data from said microprocessor to said external bus upon the common assertion of said bus timing clock and said first timing clock.

2. A timing system as defined in claim 1 wherein said output means includes gate means for initiating said supply of said output data when said bus timing clock and said first timing clock are at a high logic level.

3. A timing system as defined in claim 1 further including input means coupled to said first and second generating means for synchronizing the reception of input data, to be supplied to said microprocessor, from said external bus with said bus timing clock responsive to an inverse assertion of said bus timing clock and said second timing clock.

4. A timing system as defined in claim 3 wherein said input means includes gate means for initiating said reception of said input data when said bus timing clock is at a low logic level and said second timing clock is at a high logic level.

5. A timing system as defined in claim 2 wherein said gate means includes a first input coupled to said first timing clock and a second input coupled to said bus timing clock.

6. A timing system as defined in claim 5 wherein said gate means comprises a NAND gate and an inverter, said NAND gate and said inverter being series coupled.

7. A timing system as defined in claim 6 wherein said output means further includes an output buffer having a data input for receiving and holding said microprocessor output data to be supplied to said external bus, a clock input coupled to said inverter, and an output coupled to said external bus.

8. A timing system as defined in claim 7 wherein said output buffer is configured to receive and hold said microprocessor output data upon the rising edge of said second timing clock.

9. A timing system as defined in claim 8 wherein said output buffer further includes an enable input for enabling said output buffer to hold said microprocessor output data responsive to said rising edge of said second timing clock.

10. A timing system as defined in claim 4 wherein said gate means includes first and second series coupled field-effect transistors, wherein the gate of said first field-effect transistors is coupled to said bus timing clock and wherein the gate of said second field-effect transistors is coupled to said second timing clock.

11. A timing system as defined in claim 10 further including an inverter, wherein said first and second field-effect transistors are N-Channel transistors and wherein said gate of said first field-effect transistor is coupled to said bus timing clock by said inverter.

12. A timing system as defined in claim 11 wherein said input means further includes a latch for stabilizing said received input.

13. A timing system as defined in claim 1 wherein said second generating means includes delay means for substantially synchronizing said rising edge of said bus timing clock with said rising edge of said first timing clock and said falling edge of said second timing clock.

14. A timing system as defined in claim 13 wherein said delay means comprises a plurality of serially coupled inverters.

15. A timing system as defined in claim 1 further including a frequency divider and select means for selectively coupling said frequency divider between said buffer means and said second generating means for rendering said bus timing clock at a frequency which is a fraction of the frequencies of said first and second timing clocks.

16. A timing system as defined in claim 15 wherein said frequency divider is a divide-by-two frequency divider.

17. A timing system as defined in claim 15 wherein said select means comprises a multiplexer having a first input coupled to said buffer means, a second input coupled to said frequency divider, an output coupled to said second generating means, and a control input.

18. A timing system as defined in claim 1 wherein said second generating means further includes a mode select input for receiving a mode select signal for selecting a first mode or a second mode, wherein said second generating means is responsive to said mode select signal for operating in said first mode for providing said bus timing clock at said second generating means output, and wherein said timing system is responsive to said mode select signal for operating in said second mode for receiving an externally generated bus timing clock at said second generating means output and for initiating said supply of microprocessor data onto said external bus upon the common assertion of said externally generated bus timing clock and said first timing clock.

19. A timing system as defined in claim 18 wherein said second generating means output and said buffer means input are coupled together when said timing system is operative in said second mode to permit said first generating means to generate said first and second timing clocks responsive to said externally generated bus timing clock.

20. A timing system as defined in claim 19 wherein said second generating means further includes enable means for disabling said second generating means responsive to said mode select signal selecting said second mode.

21. A timing system as defined in claim 20 further including input means coupled to said first generating means and to said second generating means output for initiating the reception of input data from said bus upon inverse assertion of said bus timing clock and said second timing clock when said timing system is operative in said first mode and for initiating the reception of said input data from said bus upon inverse assertion of said externally generated bus timing clock and said second timing clock when said timing system is operative in said second mode.

22. A timing system as defined in claim 21 wherein said output means includes gate means for initiating said supply of said microprocessor output data responsive to said first timing clock and said bus timing clock being at a high logic level when said timing system is operative in said first mode, and responsive to said first timing clock and said externally generated bus timing clock being at a high logic level when said timing system is operative in said second mode.

23. A timing system as defined in claim 22 wherein said input means includes gate means for initiating said reception responsive to said second timing clock being at a high logic level and said bus timing clock being at a low logic level when said timing system is operative in said first mode and responsive to said second timing clock being at a high logic level and said externally generated bus timing clock being at a low logic level when said timing system is operative in said second mode.

24. A timing system for use in a microprocessor for providing microprocessor output data to an external bus, said timing system synchronizing said microprocessor output data with a bus timing clock, said timing system providing improved flexibility by being configured for either generating said bus timing clock responsive to an external clock source when in a first mode of operation or being driven by an externally generated bus timing clock when in a second mode of operation and comprising:

buffer means responsive to said external clock source for generating a first intermediate clock when said timing system is operable in said first mode and responsive to said externally generated bus timing clock for generating a second intermediate clock when said timing means is operable in said second mode said buffer means including an output;

first generating means coupled to said buffer means for generating first and second microprocessor timing clocks in response to said first intermediate clock when said timing system is in said first mode and in response to said second intermediate clock when said timing system is in said second mode, said first and second timing clocks being opposite in phase;

second generating means coupled to said buffer means output when said timing system is in said first mode for internally generating said bus timing clock in response to said first intermediate clock, said second generating means including an output for providing said external bus with said internally generated bus timing clock when said timing system is in said first mode, said second generating means output, when said timing system is in said second mode, receiving said externally generated bus timing clock;

enable means responsive to a select signal for coupling said second generating means to said buffer means output when said timing system is in said first mode and decoupling said second generating means from said buffer means output when said timing system is in said second mode; and output means coupled to said first generating means for receiving said first timing clock and coupled to said second generating means output for receiving said internally generated bus timing clock when said timing system is in said first mode or receiving said externally generated bus timing clock when said timing system is in said second mode, said output means for initiating the provision of said out data onto said external bus upon the common assertion of said first timing clock and said internally generated bus timing clock when said timing system is in said first mode or upon the common assertion of said first timing clock and said externally generated bus timing clock when said timing system is in said second mode.

25. A timing system as defined in claim 24 wherein said first and second generating means are configured when in said first mode for substantially synchronizing the rising edges of said internally generated bus timing clock with the rising edges of said first timing clock and the falling edges of said second timing clock.

26. A timing system as defined in claim 25 wherein said output means includes gate means for initiating the provision of said output data when said bus timing clocks and said first timing clock are at a high logic level.

27. A timing system as defined in claim 25 further including input means coupled to said first and second generating means for initiating reception of input data from said external bus upon inverse assertion of said bus timing clocks with respect to said second timing clock.

28. A timing system as defined in claim 27 wherein said input means includes gate means for initiating said reception of said input data when said bus timing clocks are at a low logic level and said second timing clock is at a high logic level.

29. A timing system as defined in claim 25 wherein said output means includes gate means having a first input coupled to said first timing clock and a second input coupled to said second generating means output.

30. A timing system as defined in claim 29 wherein said gate means comprises a NAND gate and an inverter, said NAND gate and said inverter being series coupled.

31. A timing system as defined in claim 30 wherein said output means further includes an output buffer having a data input for receiving and holding said output data onto said external bus, a clock input coupled to said inverter, and an output for providing said external bus with said output data.

32. A timing system as defined in claim 31 wherein said output buffer is configured to receive and hold said output data upon the rising edge of said second timing clock.

33. A timing system as defined in claim 32 wherein said output buffer further includes an enable input for enabling said output buffer to hold said output data responsive to said rising edge of said second timing clock.

34. A timing system as defined in claim 28 wherein said gate means includes first and second series coupled field-effect transistors, wherein the gate of said first field-effect transistors is coupled to said second generating means output and wherein the gate of said second field-effect transistor is coupled to said second timing clock.

35. A timing system as defined in claim 34 further including an inverter, wherein said first and second field-effect transistors are N-Channel transistors and wherein said gate of said first field-effect transistor is coupled to said second generating means output by said inverter.

36. A timing system as defined in claim 35 wherein said input means further includes a latch for stabilizing said received input.

37. A timing system as defined in claim 25 wherein said second generating means includes delay means for substantially synchronizing said rising edges of said internally generated bus timing clock with said rising edges of said first timing clock and said falling edges of said second timing clock.

38. A timing system as defined in claim 37 wherein said delay means comprises a plurality of serially coupled inverters.

39. A timing system as defined in claim 25 further including a frequency divider and select means for selectively coupling said frequency divider between said buffer means and said second generating means for rendering said internally generated bus timing clock at a frequency which is a fraction of the frequencies of said first and second timing clocks.

40. A timing system as defined in claim 39 wherein said frequency divider is a divide-by-two frequency divider.

41. A timing system as defined in claim 39 wherein said select means comprises a multiplexer having a first input coupled to said buffer means, a second input coupled to said frequency divider, an output coupled to said second generating means, and a control input.

42. A timing system as defined in claim 24 wherein said buffer means includes an input, wherein said second generating means output and said buffer means input are coupled together when said timing system is operative in said second mode of operation to permit said first generating means to generate said first and second timing clock responsive to said externally generated bus timing clock.

* * * * *